United States Patent
Choi et al.

(10) Patent No.: US 11,438,816 B2
(45) Date of Patent: Sep. 6, 2022

(54) ELECTRONIC DEVICE AND METHOD FOR CONTROLLING COMMUNICATION MODE THEREOF

(71) Applicant: Samsung Electronics Co., Ltd., Gyeonggi-do (KR)

(72) Inventors: Junsu Choi, Gyeonggi-do (KR); Hyunkee Min, Gyeonggi-do (KR); Sunkee Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 93 days.

(21) Appl. No.: 16/563,206

(22) Filed: Sep. 6, 2019

(65) Prior Publication Data

US 2020/0084684 A1 Mar. 12, 2020

(30) Foreign Application Priority Data

Sep. 6, 2018 (KR) .................. 10-2018-0106600

(51) Int. Cl.
*H04W 36/06* (2009.01)
*H04W 4/80* (2018.01)
(Continued)

(52) U.S. Cl.
CPC .......... *H04W 36/06* (2013.01); *H04L 5/0007* (2013.01); *H04W 4/80* (2018.02); *H04W 36/30* (2013.01); *H04W 84/12* (2013.01)

(58) Field of Classification Search
CPC .................................................. H04W 36/06
See application file for complete search history.

(56) References Cited

U.S. PATENT DOCUMENTS 8,355,751 B2 1/2013 Dietz et al.
2009/0245333 A1* 10/2009 Krishnamoorthi .......... H04L 25/0202
375/219

(Continued)

FOREIGN PATENT DOCUMENTS

| EP | 3 319 261 | 5/2018 |
|---|---|---|
| KR | 1020060000402 | 1/2006 |
| KR | 1020170130817 | 11/2017 |

OTHER PUBLICATIONS

Byeon, Seongho et al., MoFA: Mobility-aware Frame Aggregation in Wi-Fi, CoNEXT'14, Dec. 2-5, 2014, Sydney, Australia, 12 pages.

(Continued)

*Primary Examiner* — Edan Orgad
*Assistant Examiner* — Won Tae C Kim
(74) *Attorney, Agent, or Firm* — The Farrell Law Firm, P.C.

(57) ABSTRACT

An electronic device includes: a UI; a wireless communication circuit configured to wirelessly communicate with an external electronic device by using a short-range wireless communication protocol; a processor; and a memory. The memory stores instructions, which when executed, cause the processor to receive first data from the external electronic device at a first time through a wireless communication channel by using the wireless communication circuit, receive second data from the external electronic device at a second time after the first time through the wireless communication channel by using the wireless communication circuit, compare a first reception state related to the first data and a second reception state related to the second data, and transmit, to the external electronic device, a request for (Continued)

change from a first mode to a second mode by using the wireless communication circuit, based on a result of the comparing.

18 Claims, 16 Drawing Sheets

(51) Int. Cl.
  *H04L 5/00* (2006.01)
  *H04W 36/30* (2009.01)
  *H04W 84/12* (2009.01)

(56) References Cited

U.S. PATENT DOCUMENTS

| | | | |
|---|---|---|---|
| 2014/0036811 A1 | 2/2014 | Zhang | |
| 2014/0134990 A1 | 5/2014 | Chou | |
| 2014/0189528 A1* | 7/2014 | Chang | G06F 3/0484 715/752 |
| 2015/0139000 A1 | 5/2015 | Matin et al. | |
| 2016/0255653 A1* | 9/2016 | Malik | H04W 74/0816 370/329 |
| 2017/0244823 A1 | 8/2017 | Kim et al. | |
| 2018/0006687 A1 | 1/2018 | Porat | |
| 2018/0145812 A1 | 5/2018 | Verma et al. | |
| 2018/0242247 A1 | 8/2018 | Goh et al. | |
| 2019/0013978 A1* | 1/2019 | Zhou | H04L 5/0048 |
| 2020/0187120 A1* | 6/2020 | Alanen | H04W 52/0212 |
| 2020/0204417 A1* | 6/2020 | Yu | H04L 5/1438 |

OTHER PUBLICATIONS

Draft Standard for Information Technology—Telecommunications and information exchange between systems—Local and metropolitan area networks—Specific requirements Part 11, Amendment 4, IEEE P802.11ac/D5.0, Jan. 2013, 440 pages.
IEEE Standard for Information technology—Telecommunications and information exchange between systems—Local and metropolitan area networks—Specific requirements Part 11, Amendment 5, IEEE Std 802.11n, 2009, 536 pages.
Draft Standard for Information Technology—Telecommunications and information exchange between systems—Local and metropolitan area networks—Specific requirements Part 11, Amendment 6, IEEE P802.11ax/D2.2, Feb. 2018, 620 pages.
International Search Report dated Jan. 3, 2020 issued in counterpart application No. PCT/KR2019/011465, 7 pages.
European Search Report dated Jul. 16, 2021 issued in counterpart application No. 19856845.3-1231, 8 pages.
Indian Examination Report dated Sep. 7, 2021 issued in counterpart application No. 202117009289, 5 pages.

* cited by examiner

ELECTRONIC DEVICE AND METHOD FOR CONTROLLING COMMUNICATION MODE THEREOF

CROSS-REFERENCE TO RELATED APPLICATION(S)

This application is based on and claims priority under 35 U.S.C. § 119 to Korean Patent Application No. 10-2018-0106600, filed on Sep. 6, 2018, in the Korean Intellectual Property Office, the entire disclosure of which is incorporated herein by reference.

BACKGROUND

1. Field

The disclosure relates generally to an electronic device and a method for controlling a communication mode thereof.

2. Description of Related Art

Electronic devices (e.g., mobile terminals, smart phones, or wearable devices) often support short range wireless communication (such as Wi-Fi protocol) connect with a wireless router. For example, an electronic device may discover wireless routers existing in the proximity thereof, and may connect with one of the discovered wireless routers for short range wireless communication.

A short range wireless communication protocol often requires channel information of a wireless link to allow a reception end (for example, an electronic device) to normally receive data frames transmitted by a transmission end (for example, a wireless router). For example, the Wi-Fi protocol of Institute of Electrical and Electronics Engineers (IEEE) 802.11n or 802.11ac specification estimates channel information by using a preamble of a data frame. The Wi-Fi protocol of IEEE 802.11 lax specification provides a Doppler mode for estimating channel information by using a mid-amble, which is inserted at predetermined symbol periods when a data frame is transmitted.

SUMMARY

When channel information is changed in the middle of receiving a data frame, a reception end may not normally receive the data frame. For example, when an electronic device moves at about 1 m/s (for example, a person's walking speed), channel information may be changed in the middle of receiving a data frame according to the Wi-Fi protocol of 802.11ac specification, and a plurality of errors may occur in medium access control (MAC) protocol data units (MPDU) aggregated at a tail portion of the data frame, causing performance degradation.

Further, the Wi-Fi protocol of 802.11ax specification has a long duration of an orthogonal frequency division multiplexing (OFDM) symbol, and allows aggregation with respect to more MPDUs in comparison to 802.11ac. Therefore, the time required to transmit data frames increases, and thus the degree and/or frequency of performance degradation caused by the changing of the channel information in the middle of receiving the data frames also increases.

The 802.11ax specification requires a wireless router to determine setting of the Doppler mode. Accordingly, in order to appropriately set use or non-use of the Doppler mode and an insertion periodicity of a mid-amble according to a change in a network environment, the wireless router, which is required to execute setting related to the Doppler mode, should receive enough traffic to estimate a channel change. However, in the case of normal video streaming or web browsing, a ratio of downlink traffic is high. Therefore, the wireless router may not receive a sufficient amount of traffic, and there may be a limit to accurately estimating a channel change of a network in real time and appropriately using the Doppler mode.

In addition, since the Doppler mode is controlled at the wireless router, the wireless router may not independently set the Doppler mode for each electronic device connected thereto through wireless communication.

Accordingly, the disclosure is made to address at least the problems and/or disadvantages described above and to provide at least the advantages described below.

An aspect of the disclosure is to provide an electronic device that may access a wireless router, determine use or non-use of the Doppler mode and/or an insertion periodicity of a mid-amble according to a change of a network environment (for example, a change of channel information), mobility information of the electronic device, and/or information of an ongoing service, and deliver a result of the determining to the wireless router.

Another aspect of the disclosure is to provide a plurality of electronic devices that may access a wireless router, and individually determine use or non-use of the Doppler mode and/or an insertion periodicity of a mid-amble, based on channel estimation information (for example, a change in channel information and/or mobility information).

In accordance with an aspect of the disclosure, an electronic device is provided, which includes a user interface; a wireless communication circuit configured to wirelessly communicate with an external electronic device by using a short-range wireless communication protocol, the external electronic device being configured to transmit a first data frame including a first preamble, a first header, and a first payload in a first mode, and to transmit a second data frame comprising a second preamble, a second header, a second payload, and at least one mid-amble in the second payload in a second mode; a processor operatively connected with the user interface and the wireless communication circuit; and a memory operatively connected with the processor. The memory stores instructions, which when executed, cause the processor to receive first data from the external electronic device at a first time through a wireless communication channel by using the wireless communication circuit, receive second data from the external electronic device at a second time after the first time through the wireless communication channel by using the wireless communication circuit, compare a first reception state related to the first data and a second reception state related to the second data, and transmit a first request to change from the first mode to the second mode to the external electronic device by using the wireless communication circuit, based on a result of the comparing.

In accordance with another aspect of the disclosure, an electronic device is provided, includes a sensor; a communication circuit configured to wirelessly communicate with an external electronic device by using a short-range wireless communication protocol, the external electronic device being configured to transmit a first data frame including a first preamble, a first header, and a first payload in a first mode, and to transmit a second data frame including a second preamble, a second header, a second payload, and at least one mid-amble in the second payload in a second mode; a processor operatively connected with the sensor and the wireless communication circuit; and a memory operatively connected with the processor. The memory stores instructions, which when executed, cause the processor to receive data from the external electronic device in the first mode through a wireless communication channel by using the wireless communication circuit, estimate mobility information of the electronic device through the sensor, and transmit, to the external electronic device, a request to change from the first mode to the second mode by using the wireless communication circuit, based on the estimated mobility information of the electronic device.

In accordance with another aspect of the disclosure, an electronic device is provided, which includes a wireless communication circuit configured to wirelessly communicate with an external electronic device by using a short-range wireless communication protocol, the external electronic device being configured to transmit a first data frame including a first preamble, a first header, and a first payload in a first mode, and to transmit a second data frame including a second preamble, a second header, a second payload, and at least one mid-amble in the second payload in a second mode; a processor operatively connected with the wireless communication circuit; and a memory operatively connected with the processor. The memory stores instructions, which when executed, cause the processor to detect execution of a service that receives data from the external electronic device, determine to change from the first mode to the second mode based on the executed service, and transmit, to the external electronic device, a request to change to the second mode by using the wireless communication circuit, wherein the request includes an insertion periodicity of the mid-amble.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
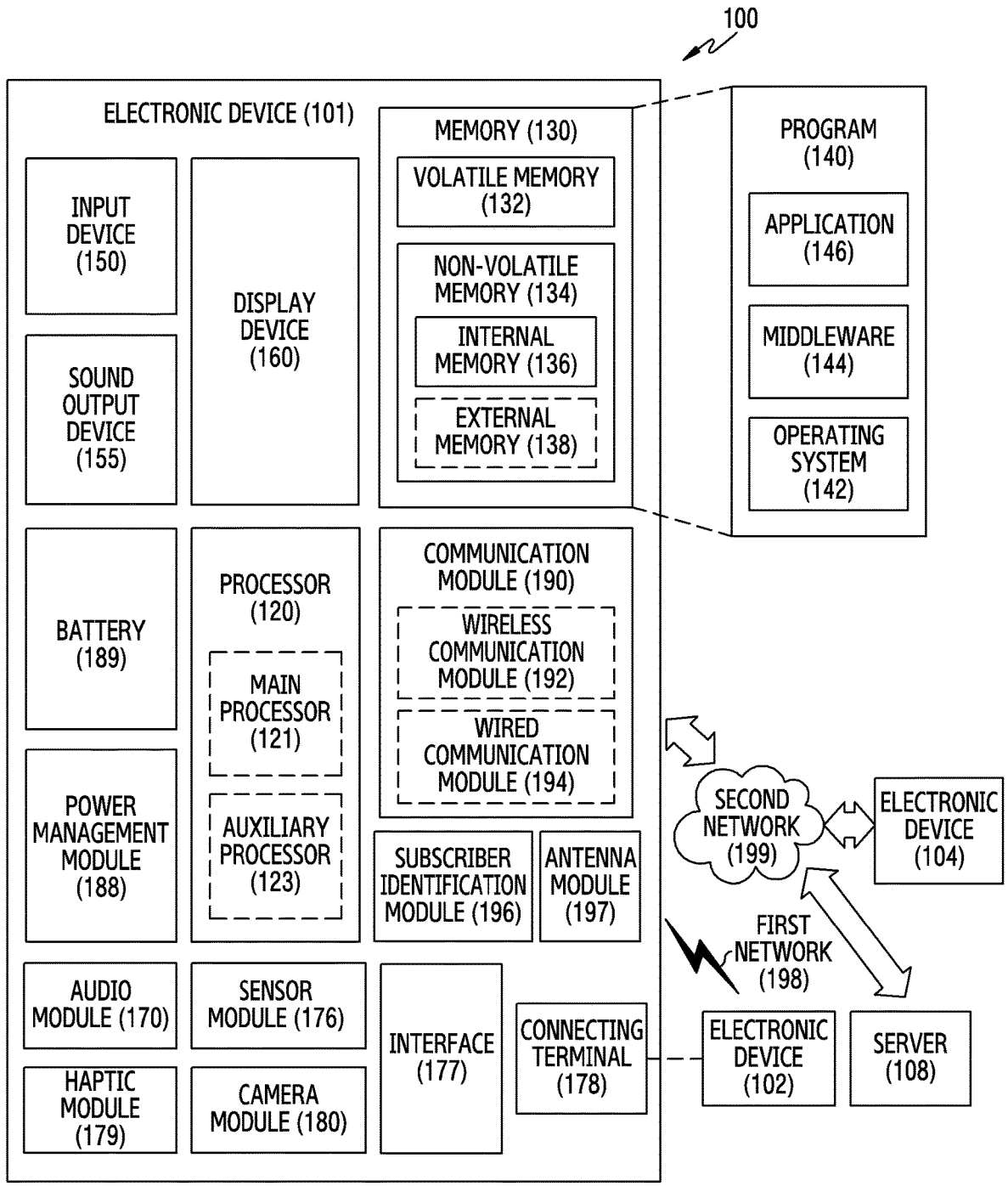
FIG. 1 illustrates an electronic device in a network environment according to an embodiment.

Hereinafter, various embodiments of the disclosure will be described with reference to the accompanying drawings. In the disclosure, specific embodiments are illustrated in the drawings and relevant detailed descriptions are provided, but this is not intended to limit various embodiments of the disclosure to specific forms. For example, it is obvious to those skilled in the art to which the disclosure belongs that embodiments of the disclosure can be variously changed.

Throughout the drawings and descriptions thereof, like reference numbers may be used to depict the same or similar elements, features, and structures.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
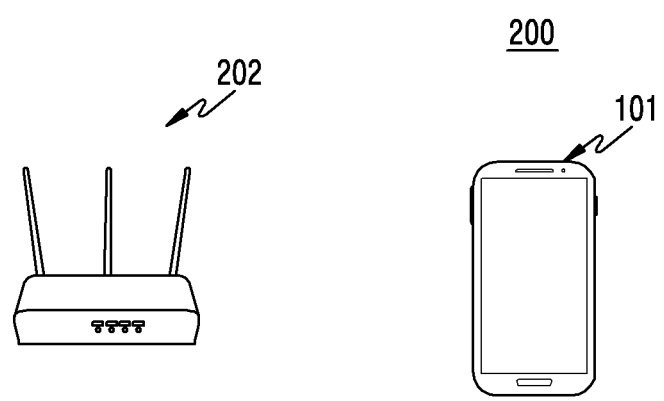
FIG. 2 illustrates a communication system including an electronic device and an external electronic device according to an embodiment.

FIG. 2 illustrates a communication system including an electronic device and an external electronic device according to an embodiment.

Referring to FIG. 2, a communication system 200 includes an electronic device 101 and an external electronic device 202 (e.g., the electronic device 102 of FIG. 1).

The electronic device 101 may perform short range wireless communication (for example, Wi-Fi) with the external electronic device 202. The electronic device 101 may be a smartphone, a notebook, a tablet personal computer (PC), a desktop PC, or a wearable electronic device.

The external electronic device 202 may be a router device that connects different networks (for example, a LAN or a WAN). For example, the external electronic device 202 may include an AP to convert a wireless signal into a wired signal or to convert a wired signal into a wireless signal.

The electronic device 101 may wirelessly communicate with the external electronic device 202 through a short range wireless communication, such as the Wi-Fi protocol of the IEEE 802.1 1ax specification.

The Wi-Fi protocol of the 802.11ax specification may have an OFDM discrete Fourier transform (DFT) period ranging from 3.2 µs to 12.8 µs, which is four times longer than that of the Wi-Fi protocol of the 802.11n or 802.11ac specification, and may support aggregation of 64-256 MPDUs.

The Wi-Fi protocol of the 802.11ax specification may support the Doppler mode in which a mid-amble is inserted in every predetermined symbol period when a data frame is transmitted, and is transmitted. For example, the Wi-Fi protocol of the 802.1 1ax specification may activate (or enable) or deactivate (or disable) the Doppler mode, and may insert a mid-amble in every specified symbol period (e.g., 10 or 20 symbols) and may transmit a data frame when the Doppler mode is activated. The Doppler mode is useful since a data frame can be normally received even when a network condition (e.g., channel information) is changed in the middle of receiving the frame, but may cause an overhead due to the use of the mid-amble. For example, when four training symbols are inserted as a mid-amble in a period of 10 symbols, an overhead of about 40% may occur due to the insertion of the mid-amble.

When the electronic device 101 wirelessly communicates with the external electronic device 202 through the Wi-Fi protocol of 802.1 ax specification, the electronic device 101 may appropriately determine use or non-use of the Doppler mode and/or an insertion periodicity of a mid-amble, based at least in part on a condition of a network with the external electronic device 202. The electronic device 101 may estimate a degree of change of channel information according to time, and may determine use or non-use of the Doppler mode and/or an insertion periodicity of a mid-amble, based on a result of the estimating. When a wireless link with the external electronic device 202 is estimated in a static condition (for example, a change of channel information according to time is less than (or less than or equal to) a specified value), the electronic device 101 may determine to deactivate the Doppler mode (for example, to operate in a first mode), and may transmit the result of determining to the external electronic device 202.

However, when the wireless link with the external electronic device 202 is estimated in a dynamic condition (for example, a change of channel information according to time is greater than or equal to a specified value (or exceeds the specified value), the electronic device 101 may determine to activate the Doppler mode (for example, to operate in a second mode), and may transmit the result of determining to the external electronic device 202.

When the Doppler mode is activated, the electronic device 101 may determine an insertion periodicity (e.g., 10 symbols or 20 symbols) of the mid-amble, which is suitable to the network condition.

The change of the channel information may be estimated by comparing a first reception state related to first data received at a first time, and a second reception state related to second data received at a second time after the first time. The change of the channel information may be estimated based on mobility information of the electronic device 101, which is detected through at least one sensor mounted in the electronic device 101. The change of the channel information may be estimated through a combination of a change of the reception state and the mobility information.

The electronic device 101 may determine use or non-use of the Doppler mode and/or an insertion periodicity of a mid-amble, based on an ongoing service or state information of a terminal.

The electronic device 101 may transmit a result of determining the use or non-use of the Doppler mode and/or the insertion periodicity of the mid-amble to the external electronic device 202. For example, the electronic device 101 may transmit a request for change from the first mode (e.g., deactivation of the Doppler mode) to the second mode (e.g., activation of the Doppler mode) to the external electronic device 202. Alternatively, the electronic device 101 may transmit a request for change from the second mode to the first mode to the external electronic device 202. For example, when a change of channel information from a static condition to a dynamic condition is estimated, the electronic device 101 may transmit the request for change from the first mode to the second mode to the external electronic device 202, and, when a change of channel information from a dynamic condition to a static condition is estimated, the electronic device 101 may transmit the request for change from the second mode to the first mode to the external electronic device 202. When it is determined that wireless communication with the external electronic device 202 is performed in the first mode, the electronic device 101 may receive, from the external electronic device 202, a data frame including a preamble, a header, and a payload. When it is determined that wireless communication with the external electronic device 202 is performed in the second mode, the electronic device 101 may receive, from the external electronic device 202, a data frame including a preamble, a header, a payload, and at least one mid-amble in the payload.

The external electronic device 202 may be connected with the Internet through a wired communication interface, and may convert a wired signal received through the Internet into a wireless signal and may transmit the wireless signal to a nearby electronic device 101. In addition, the external electronic device 202 may connect wireless communication with a nearby electronic device 101 through a wireless communication circuit, and may convert a wireless signal received from the nearby electronic device into a wired signal and may transmit the wired signal to a destination (e.g., the server 108 of FIG. 1) through the Internet.

The external electronic device 202 may transmit a data frame to the electronic device 101 based on setting information of the Doppler mode (for example, activation/deactivation of the Doppler mode, and/or an insertion periodicity of a mid-amble) which is received from the electronic device 101.

The external electronic device 202 may perform transmission and reception scheduling with respect to each of a plurality of electronic devices based on setting information of the Doppler mode received from each of the electronic devices. This will be described in detail below with reference to FIGS. 7 and 8.

Although FIG. 2 illustrates that the external electronic device 202 is a wireless router fixed to a specific position, the external electronic device 202 may be a movable electronic device including an Internet sharing function (for example, a mobile hotspot function). This will be described in detail below with reference to FIGS. 12 and 13.

The electronic device 101 may set the Doppler mode based on a directionality of a data frame. For example, when a downlink data frame is a dominant data frame, the electronic device 101 may estimate channel information based on the received downlink data frame, may determine setting information of the Doppler mode based at least in part on the estimated channel information, and may transmit the determined setting information to the external electronic device 202. However, when the downlink data frame is not a dominant data frame, the electronic device 101 may receive setting information of the Doppler mode from the external electronic device 202, and may wirelessly communicate with the external electronic device 202 based on the received setting information.

The external electronic device 202 may also set the Doppler mode based on a directionality of a data frame. When an uplink data frame received from the electronic device 101 is a dominant data frame, the external electronic device 202 may determine setting information of the Doppler mode based on channel information estimated based at least in part on the uplink data frames. However, when the uplink data frame is not a dominant data frame, the external electronic device 202 may receive setting information of the Doppler mode from the electronic device 101, and may wirelessly communicate with the electronic device 101 based on the received setting information. This will be described below in detail with reference to FIG. 14.

According to an embodiment, an electronic device (e.g., the electronic device 101) may include a user interface (e.g., the input device 150); at least one wireless communication circuit (e.g., the wireless communication module 192) configured to wirelessly communicate with an external electronic device (e.g., the electronic device 102 or the external electronic device 202) by using a short-range wireless communication (e.g., WiFi) protocol, the external electronic device being configured to transmit a data frame including a preamble, a header, and a payload in a first mode, and to transmit a data frame including a preamble, a header, a payload, and at least one mid-amble in the payload in a second mode; a processor (e.g., the processor 120) operatively connected with the user interface and the wireless communication circuit; and a memory (e.g., the memory 130) operatively connected with the processor, and, when being executed, the memory stores instructions that cause the processor to receive first data from the external electronic device at a first time through a wireless communication channel by using the wireless communication circuit, to receive second data from the external electronic device at a second time after the first time through the wireless communication channel by using the wireless communication circuit, to compare a first reception state related to the first data and a second reception state related to the second data, and to transmit a request for change from the first mode to the second mode to the external electronic device by using the wireless communication circuit, based at least in part on a result of the comparing.

The instructions may cause the processor to receive one data frame including a payload from the external electronic device in the first mode, and the first data and the second data may be included in the payload.

The instructions may cause the processor to receive a first data frame and a second data frame from the external electronic device in the first mode. The first data may be included in the first data frame, and the second data may be included in the second data frame.

The WiFi protocol may include the IEEE 802.11ax, and the second mode may be a communication mode in which a Doppler mode is enabled.

The wireless communication channel may include a specified frequency, and the first reception state may include a reception state at the specified frequency when the first data is received. The second reception state may include a reception state at the specified frequency when the second data is received.

The specified frequency may include a pilot sub-carrier frequency.

The instructions may cause the processor to perform the comparing based on a correlation between the first reception state and the second reception state.

The first data may include a first OFDM symbol and the second data may include a second OFDM symbol.

The request may be included in at least one of the header or a vendor specific information element.

The request may be included in a vendor specific action frame which is transmitted to the external electronic device.

The request may further include an insertion periodicity of the mid-amble.

The instructions may cause the processor to receive third data from the external electronic device at a third time through the wireless communication channel by using the communication circuit, to receive fourth data from the external electronic device at a fourth time after the third time through the wireless communication channel by using the communication circuit, to compare a third reception state related to the third data and a fourth reception state related to the fourth data, and to transmit a request for change from the second mode to the first mode to the external electronic device based at least in part on a result of the comparing.

The electronic device may further include at least one sensor, and the instructions may cause the processor to estimate a movement of the electronic device by using sensor information collected through the at least one sensor, and to transmit a request for change to the first mode or the second mode to the external electronic device, based at least in part on the estimated movement of the electronic device.

The instructions may cause the processor to detect state information regarding whether the electronic device is movable, and to transmit a request for change to the first mode or the second mode to the external electronic device based at least in part on the state information.

The instructions may cause the processor to detect execution of a service which receives data from the external electronic device, and to transmit a request for change to the first mode or the second mode to the external electronic device based at least in part on information related to the executed service.

The external electronic device may be an electronic device supporting mobile hotspot or a mobile router, and the external electronic device may be configured to determine to maintain the second mode or to change to the first mode, based at least in part on mobility information of the external electronic device which is collected through at least one sensor, and to transmit a data frame to the electronic device according to a result of the determining.

The instructions may cause the processor to transmit a result of comparing the first reception state and the second reception state to the external electronic device, and to receive a data frame in a mode which is determined by the external electronic device based at least in part on the result of the comparing.

The external electronic device may be configured to, in a communication environment with the electronic device in which an uplink data frame is dominant, estimate a channel change based on the uplink data frame, and to determine to change to the first mode or the second mode based on the estimated channel change; and, in a communication environment with the electronic device in which a downlink data frame is dominant, determine to change to the first mode or the second mode based at least in part on the request for change received from the electronic device.

According to an embodiment, an electronic device (e.g., the electronic device 101) may include at least one sensor (e.g., the sensor module 176); at least one wireless communication circuit (e.g., the wireless communication module 192) configured to wirelessly communicate with an external electronic device (e.g., the electronic device 102 or the external electronic device 202) by using a short-range wireless communication (e.g., WiFi) protocol, the external electronic device being configured to transmit a data frame including a preamble, a header, and a payload in a first mode, and to transmit a data frame including a preamble, a header, a payload, and at least one mid-amble in the payload in a second mode; a processor (e.g., the processor 120) operatively connected with the at least one sensor and the wireless communication circuit; and a memory (e.g., the memory 130) operatively connected with the processor, and, when being executed, the memory stores instructions that cause the processor to receive data from the external electronic device in the first mode through a wireless communication channel by using the wireless communication circuit, to estimate mobility information of the electronic device through the at least one sensor, and to transmit a request for change from the first mode to the second mode to the external electronic device by using the wireless communication circuit, based at least in part on the estimated mobility information of the electronic device.

According to an embodiment, an electronic device (e.g., the electronic device 101) may include at least one wireless communication circuit (e.g., the wireless communication module 192) configured to wirelessly communicate with an external electronic device (e.g., the electronic device 102 or the external electronic device 202) by using a short-range wireless communication (e.g., WiFi) protocol, the external electronic device being configured to transmit a data frame including a preamble, a header, and a payload in a first mode, and to transmit a data frame including a preamble, a header, a payload, and at least one mid-amble in the payload in a second mode; a processor (e.g., the processor 120) operatively connected with the wireless communication circuit; and a memory (e.g., the memory 130) operatively connected with the processor, and, when being executed, the memory stores instructions that cause the processor to detect execution of a service which receives data from the external electronic device, to determine to change from the first mode to the second mode based at least in part on the executed service, and to transmit a request for change to the second mode which includes an insertion periodicity of the mid-amble to the external electronic device by using the wireless communication circuit.

Figure 3:
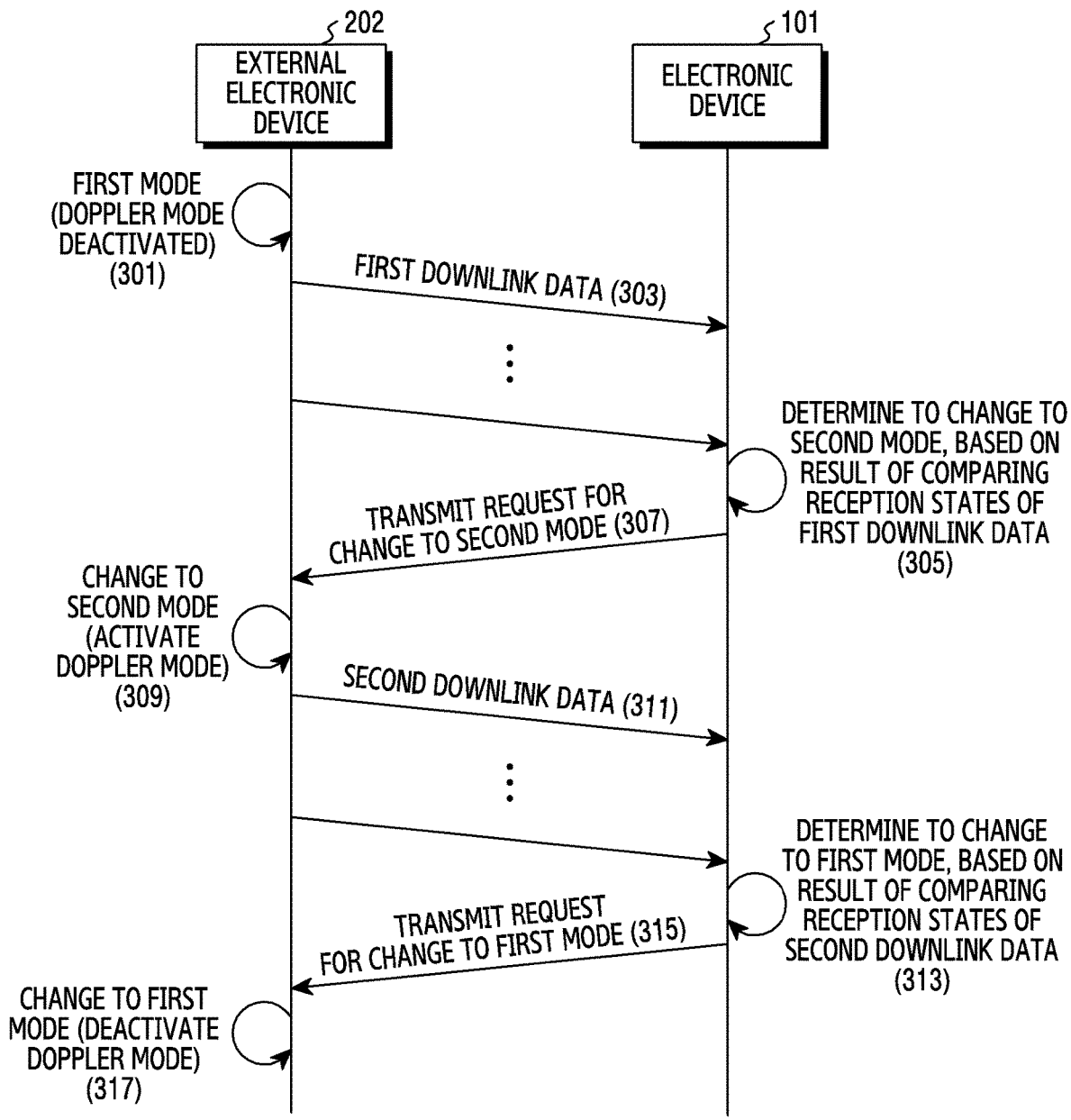
FIG. 3 is a signal flow diagram illustrating a method for controlling a communication mode of a communication system according to an embodiment.

FIG. 3 is a flowchart illustrating a method for controlling a communication mode of a communication system according to an embodiment.

Referring to FIG. 3, an electronic device 101 and an external electronic device 202 are connected for short-range wireless communication. For example, the electronic device 101 may be connected with the external electronic device 202 through the Wi-Fi protocol of the 802.11ax specification.

When a wireless connection is established between the electronic device 101 and the external electronic device 202, the external electronic device 202 operates in a first mode in operation 301. The first mode, which is a default mode, may be a communication mode in which the Doppler mode is deactivated (or disabled).

In operation 303, the external electronic device 202 transmits at least one first downlink data frame to the electronic device 101.

Figure 4A:
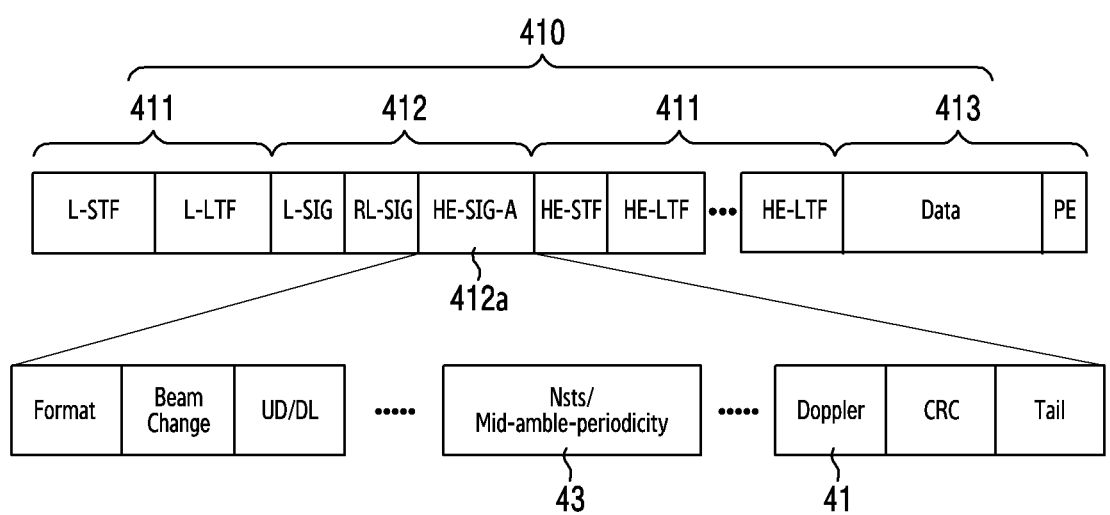
FIG. 4A illustrates a link frame of a first mode according to an embodiment.

FIG. 4A illustrates a link frame of a first mode according to an embodiment.

Referring to FIG. 4A, the first downlink data frame 410 includes a preamble 411, a header 412, and a payload 413. The preamble 411 may include information for synchronizing transmission timing between systems. The header 412 may include information (data) indicating use or non-use of the Doppler mode and an insertion periodicity of a mid-amble. The information may be included in an HE-SIG-A field 412a of the header 412. For example, the use or non-use (activation or deactivation) of the Doppler mode may be included in a Doppler field 41 of the HE-SIG-A field 412a, and the insertion periodicity of the mid-amble may be included in an Nsts/mid-amble periodicity field 43. The payload 413 may include data for determining a correlation between reception states of the first downlink data frames 410. The data may include an OFDM symbol. The other fields of the first downlink data frame 410 are fields defined in the 802.11ax, specification and will not be described in detail herein.

Referring again to FIG. 3, in operation 305, the electronic device 101 determines whether to change to a second mode, based on a result of comparing the reception states of the first downlink data frames. For example, the electronic device 101 may compare a first reception state related to first data received at a first time, and a second reception state related to second data received at a second time, and may determine whether to change from the first mode to the second mode, based at least in part on the result of comparing. The second mode may be a communication mode in which the Doppler mode is activated (or enabled).

When the electronic device 101 determines to change to the second mode in operation 305, the electronic device 101 transmits a request to change to the second mode to the external electronic device 202 in operation 307. The request to change to the second mode may be included in at least one of a header or a vendor specific information element of an uplink data frame transmitted to the external electronic device 202. The uplink data frame may have the same structure as that of the first downlink data frame 410 of FIG. 4A. For example, when a degree of estimated channel change is greater than or equal to (or exceeds) a specified first reference value, the electronic device 101 may determine to change to the second mode, may change a value of the Doppler field of the uplink data frame from false (e.g., 0) to true (e.g., 1), and may transmit the uplink data frame to the external electronic device 202.

The request for change to the second mode may be included in a vendor specific action frame transmitted to the external electronic device 202.

The request for change to the second mode may further include an insertion periodicity of a mid-amble. For example, when the degree of estimated channel change exceeds (or is greater than or equal to the first reference value, which is set to determine activation/deactivation of the Doppler mode, and is less than or equal to (or less than) a specified second reference value, the electronic device 101 may set the insertion periodicity of the mid-amble to 20 symbols, and, when the degree of channel change exceeds (or is greater than or equal to the second reference value, the electronic device 101 may set the insertion periodicity of the mid-amble to 10 symbols.

In the example above, although the reference value for determining the insertion periodicity of the mid-amble is one value (e.g., the second reference value), and two insertion periodicities are provided, the disclosure is not limited to this example. For example, two or more reference values for determining the insertion periodicity of the mid-amble may be provided and three or more insertion periodicities of the mid-amble may be provided.

In operation 309, the external electronic device 202 changes to the second mode.

In operation 311, the external electronic device 202 transmits at least one second downlink data frame to the electronic device 101. For example, when the request is received, the external electronic device 202 may change to the second mode if the value of the Doppler field included in the uplink data frame is true, and may insert the mid-amble in every period included in the mid-amble periodicity field and may transmit the second downlink data frame to the electronic device 101.

Figure 4B:
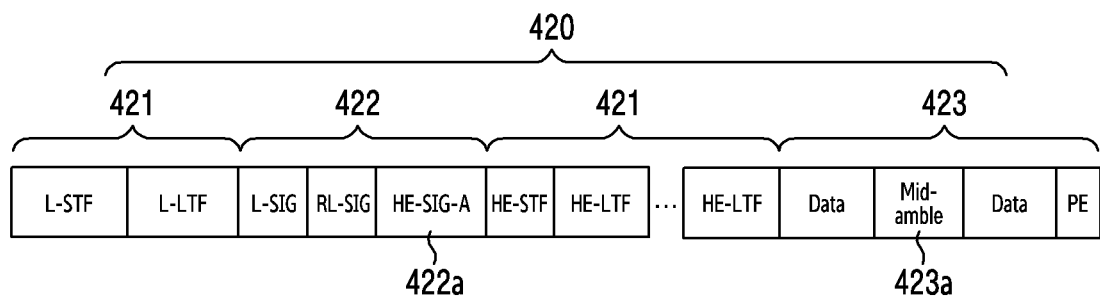
FIG. 4B illustrates a link frame of a second mode, when communication with one electronic device is performed, according to an embodiment.

FIG. 4B illustrates a link frame of a second mode, when communication with one electronic device is performed, according to an embodiment.

Referring to FIG. 4B, the second downlink data frame 420 includes a preamble 421, a header 422, and a payload 423. The header 422 includes an HE-SIG-A field 422a. The payload 423 includes at least one mid-amble 423a. The second downlink data frame 420) of FIG. 4B is a data frame structure when communication with one electronic device 101 is performed.

Figure 4C:
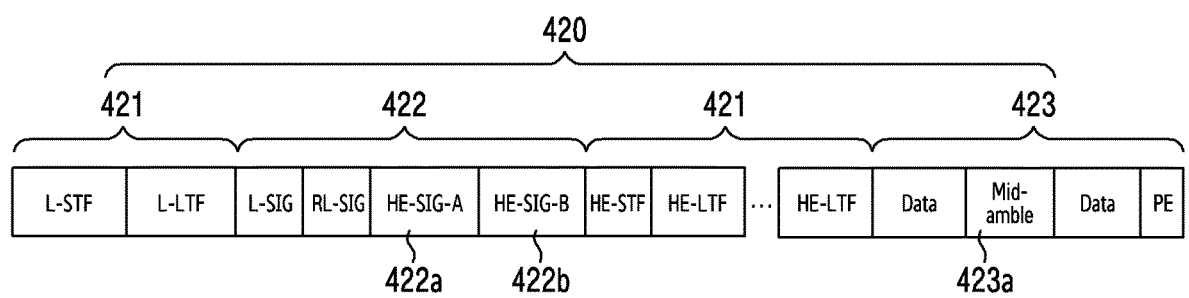
FIG. 4C illustrates a link frame of a second mode, when communication with a plurality of electronic devices is performed, according to an embodiment.

FIG. 4C illustrates a link frame of a second mode, when communication with a plurality of electronic devices is performed, according to an embodiment.

Referring to FIG. 4C, when the external electronic device 202 communicates with a plurality of electronic devices, the header 422 of the second downlink data frame 420 further includes at least one HE-SIG-B field 422b.

Referring again to FIG. 3, in operation 313, the electronic device 101 determines whether to change to the first mode based on a result of comparing reception states of the second downlink data frames. For example, the electronic device 101 may compare a third reception state related to third data received at a third time, and a fourth reception state related to fourth data received at a fourth time, and may determine whether to change from the second mode to the first mode, based at least in part on the result of comparing. When the electronic device 101 rarely moves, the electronic device 101 is mounted in a specified device (for example, a docking device or a wireless charger), or the degree of estimated channel change is reduced to be less than (or less than or equal to) the first reference value due to reduction of interference by a noise, the electronic device 101 may determine that it is necessary to change to the first mode. Alternatively, when an ongoing service (for example, a web browser or video streaming) is terminated, the electronic device 101 may determine that it is necessary to change to the first mode.

When it is determined that it is necessary to change to the first mode in operation 313, the electronic device 101 transmits a request to change to the first mode to the external electronic device 202 in operation 315.

In operation 317, the external electronic device 202 changes to the first mode (e.g., deactivation of the Doppler mode).

Figure 5:
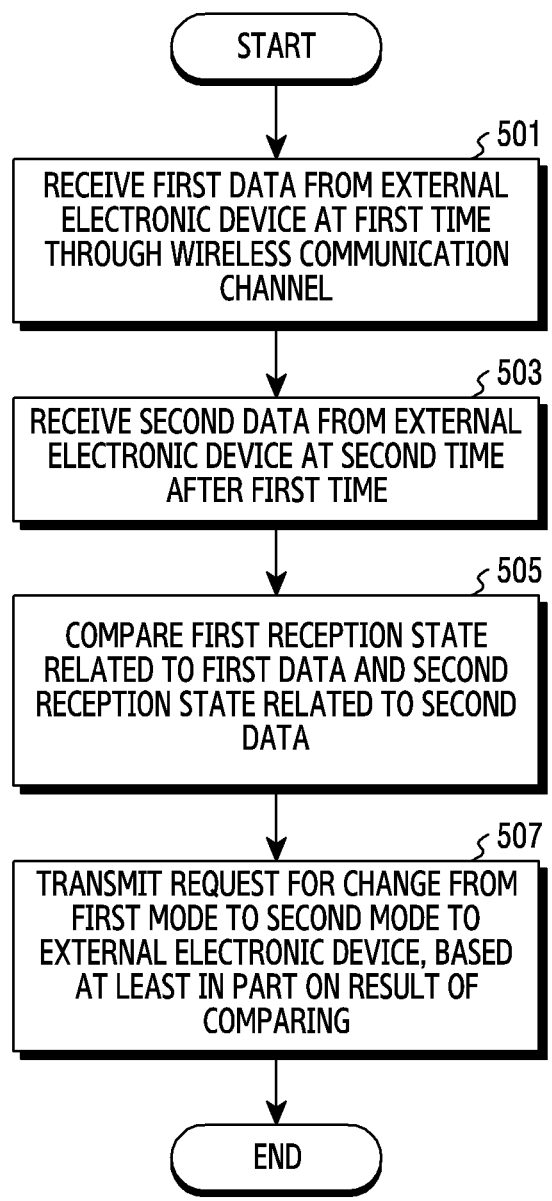
FIG. 5 is a flowchart illustrating a method for controlling a communication mode based on a reception state of data of an electronic device according to an embodiment.

FIG. 5 is a flowchart illustrating a method for controlling a communication mode based on a reception state of data of an electronic device according to an embodiment.

Referring to FIG. 5, a processor (e.g., the processor 120 of FIG. 1) of the electronic device (e.g., the electronic device 101) wirelessly communicates with an external electronic device (e.g., the electronic device 102 of FIG. 1 or the external electronic device 202 of FIGS. 2 and 3) by using a short-range wireless communication (e.g., Wi-Fi) protocol. The Wi-Fi protocol may include the IEEE 802.11ax. The external electronic device may transmit a data frame including a preamble, a header, and a payload in a first mode, and may transmit a data frame including a preamble, a header, a payload, and at least one mid-amble in the payload in a second mode. The first mode may be a communication mode in which the Doppler mode is disabled (or deactivated), and the second mode may be a communication mode in which the Doppler mode is enabled (or activated).

In operation 501, the processor receives first data from the external electronic device at a first time through a wireless communication channel by using a wireless communication circuit (e.g., the wireless communication module 192 of FIG. 1).

In operation 503, the processor receives second data from the external electronic device at a second time, after the first time, through the wireless communication channel by using the wireless communication circuit. For example, the processor may receive one data frame including the first data and the second data from the external electronic device in the first mode by using the wireless communication circuit. The first data and the second data may be included in a payload of the one data frame. The processor may also receive a first data frame including the first data and may receive a second data frame including the second data from the external electronic device in the first mode by using the wireless communication circuit. The first data and the second data may be included in payloads of the first data frame and the second data frame, respectively. The first data may include a first OFDM symbol and the second data may include a second OFDM symbol.

In operation 505, the processor compares a first reception state related to the first data and a second reception state related to the second data. The first reception state may include a reception state of a frequency (hereinafter, a first frequency) of a pilot sub-carrier transmitting a specified signal when the first data is received, and the second reception state may include a reception state of the first frequency when the second data is received.

The processor may compare the reception states based on a correlation between the first reception state and the second reception state. For example, when a data frame is transmitted using the Wi-Fi protocol of the IEEE 802.11ax specification, a data sub-carrier for transmitting digital data and a pilot sub-carrier used for tracking of a frequency offset may also be transmitted. In the case of the data sub-carrier, a signal to be transmitted may vary according to digital data that should be transmitted, but, in the case of the pilot sub-carrier, an already known (specified) signal may be transmitted. Accordingly, the processor may estimate a channel change according to time by using the pilot sub-carrier when receiving a data frame.

For example, if channel information estimated from a specific pilot sub-carrier and an n-th symbol in a space time stream in the electronic device when a data frame is received is $a_n$, a correlation may be represented when there is a difference of m symbols as shown in Equation (1) below.

$$\frac{\langle a_n a_{n+m}^* \rangle}{\sqrt{\langle a_n a_n^* \rangle \langle a_{n+m} a_{n+m}^* \rangle}} = \Gamma_m \qquad (1)$$

If a size of a minimum correlation required to normally receive the data frame is $\rho$, the processor may activate (enable) the Doppler mode when an estimated correlation ($\Gamma_m$) of the electronic device exceeds (or is greater than or equal to) $\rho$, and may deactivate (disable) the Doppler mode when the estimated correlation ($\Gamma_m$) is less than or equal to (or is less than) $\rho$.

The processor may determine an insertion periodicity of a mid-amble as follows.

i) If maximum m satisfying $|\Gamma_m| \geq \rho$ is less than 20, the insertion periodicity of the mid-amble is 10 symbols;

ii) If maximum m satisfying $|\Gamma_m| \geq \rho$ is greater than or equal to 20, the insertion periodicity of the mid-amble is 20 symbols; and iii) If maximum m satisfying $|\Gamma_m| \geq \rho$ is greater than the total symbol number necessary for transmitting all of data frames, the Doppler mode is disabled.

$\rho$ may be obtained through experimentation. The above-described example does not limit the disclosure, and a condition for determining use or non-use of the Doppler mode and/or the insertion periodicity of the mid-amble may be variously set. For example, one mid-amble insertion periodicity or three or more mid-amble insertion periodicities may be provided.

In operation 507, the processor transmits, to the external electronic device, a request to change from the first mode to the second mode by using the wireless communication circuit, based at least in part on the result of comparing. The request to change to the second mode may be included in a header of a data frame (e.g., an uplink data frame) transmitted to the external electronic device. The request to change to the second mode may be included in a Doppler field included in an HE-SIG-A field of the uplink data frame.

The request to change to the second mode may further include a mid-amble insertion periodicity. For example, the mid-amble insertion periodicity may be included in a mid-amble periodicity field included in the HE-SIG-A field of the uplink data frame.

The external electronic device that receives the request to change to the second mode may identify whether a value of the Doppler field is true, and, if the value is true, may identify the mid-amble insertion periodicity from the mid-amble periodicity field.

The request to change to the second mode may be included in a vendor specific information element. The vendor specific information element may be a reservation field that is not currently used and has been reserved for later use. The request may be included in a vendor specific action frame transmitted to the external electronic device. The vendor specific action frame may be a frame that is not specified in the specification and is separately provided by a vendor for a specific purpose.

Figure 6:
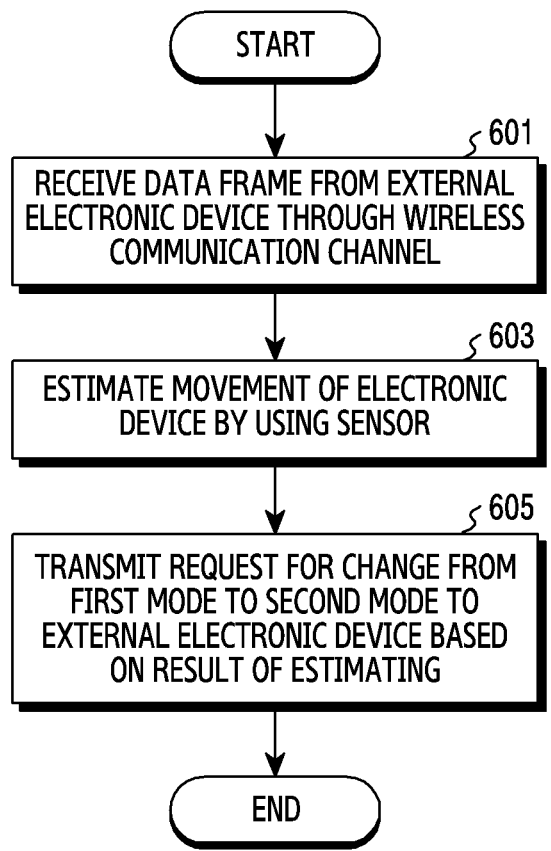
FIG. 6 is a flowchart illustrating a method for controlling a communication mode based on mobility information of an electronic device according to an embodiment.

FIG. 6 is a flowchart illustrating a method for controlling a communication mode based on mobility information of an electronic device according to an embodiment.

Referring to FIG. 6, a processor (e.g., the processor 120 of FIG. 1) of the electronic device (e.g., the electronic device 101) wirelessly communicates with an external electronic device (e.g., the electronic device 102 of FIG. 1 or the external electronic device 202 of FIGS. 2 and 3) by using a short-range wireless communication (e.g., Wi-Fi) protocol.

In operation 601, the processor receives a data frame from the external electronic device through a wireless communication channel by using a wireless communication circuit (e.g., the wireless communication module 192 of FIG. 1). For example, the electronic device may receive a data frame from the external electronic device operating in a first mode (disabling of the Doppler mode).

In operation 603, the processor estimates a movement of the electronic device by using at least one sensor (e.g., the sensor module 176 of FIG. 1). When a movement of the electronic device is detected through the at least one sensor, the processor may estimate a movement direction and/or a movement velocity of the electronic device by analyzing collected sensor information. The at least one sensor may include an acceleration sensor, an angular velocity sensor, a gyro sensor, and/or a geomagnetic sensor.

The processor may estimate a movement of the electronic device through a strength of a signal received from the external electronic device. For example, when the strength of the received signal gradually increases, the processor may estimate that the electronic device is moving toward the external electronic device, and, when the strength of the received signal gradually decreases, the processor may estimate that the electronic device moves away from the external electronic device.

In operation 605, the processor transmits, to the external electronic device, a request to change from the first mode to a second mode based on the result of estimating. For example, when an estimated velocity V of the electronic device exceeds (or is greater than or equal to a specified velocity (maximum allowable velocity), the processor may enable the Doppler mode, and, when the estimated velocity V is less than or equal to (or less than) the specified velocity, may maintain disabling of the Doppler mode.

Assuming that a maximum allowable velocity for operating in the first mode is set to $V_1$, and a maximum allowable velocity for enabling the second mode and having a mid-amble insertion periodicity of 20 symbols is set to $V_2$, the processor may determine a mid-amble insertion periodicity as follows.

i) If $V<V_1$, the Doppler mode is disabled (first mode).
ii) If $V_1<V<V_2$, the Doppler mode is enabled and the mid-amble insertion periodicity is 20 symbols.
iii) If $V_2<V$, the Doppler mode is enabled and the mid-amble insertion periodicity is 10 symbols.

$V_1$ and $V_2$ may be obtained through experimentation. The above-described example does not limit the disclosure, and a condition for determining use or non-use of the Doppler mode and/or a mid-amble insertion periodicity may be variously set. For example, three or more mid-amble insertion periodicities may be provided.

The electronic device may estimate a channel change by considering both a reception state of a data frame (e.g., operations of FIG. 5) and mobility information of the electronic device.

The electronic device may estimate a change of channel information, and may transmit the result of estimating to the external electronic device. In this case, the external electronic device may determine use or non-use of the Doppler mode and/or a mid-amble insertion periodicity, based on the result of estimating. For example, the electronic device may transmit, to the external electronic device, information of a symbol interval in which a channel is meaningfully changed (e.g., channel state can change to cause an error), and may cause the external electronic device to determine use or non-use of the Doppler mode and/or a mid-amble insertion periodicity based on the information of the symbol interval.

Figure 7:
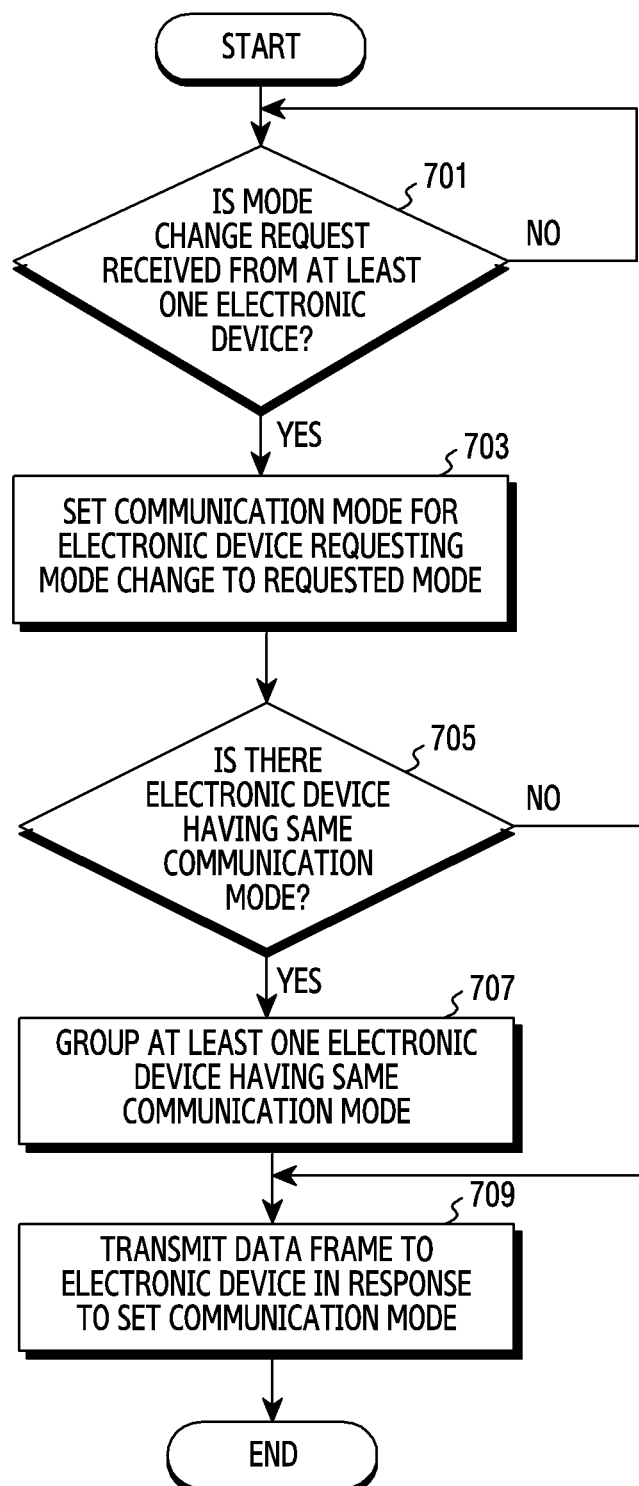
FIG. 7 is a flowchart illustrating a method for controlling a communication mode of an external electronic device according to an embodiment.
Figure 8:
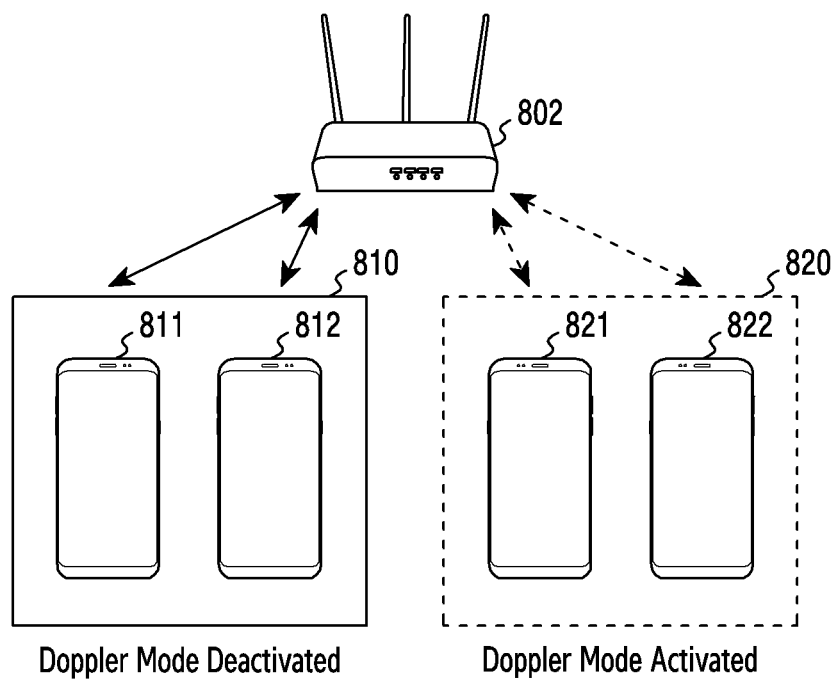
FIG. 8 illustrates method for controlling a communication mode of an external electronic device according to an embodiment.

FIG. 7 is a flowchart illustrating a method for controlling a communication mode of an external electronic device according to an embodiment. FIG. 8 illustrates a method for controlling a communication mode of an external electronic device according to an embodiment.

Referring to FIGS. 7 and 8, a processor of an external electronic device 802 (e.g., the electronic device 102 of FIG. 1 or the external electronic device 202 of FIGS. 2 and 3) may wirelessly communicate with at least one electronic device 811, 812, 821, or 822 by using a Wi-Fi protocol.

In operation 701, the external electronic device 802 identifies whether a mode change request is received from at least one of the electronic devices 811, 812, 821, or 822.

When a mode change request is received in operation 701, the external electronic device 802 sets a communication mode for the at least one electronic device requesting the mode change to a requested mode in operation 703. For example, the external electronic device 802 may set use or non-use of the Doppler mode and/or a mid-amble insertion periodicity in wirelessly communicating with the electronic device that requests use of the Doppler mode.

In operation 705, the external electronic device 802 identifies whether there are electronic devices having the same communication mode. For example, the external electronic device 802 may identify whether there are electronic devices having the same condition regarding the use or non-use of the Doppler mode and/or the mid-amble insertion periodicity.

When there are no electronic devices having the same communication mode in operation 705, the method proceeds directly to operation 709.

However, when there are electronic devices having the same communication mode, the external electronic device 802 may group the electronic devices having the same communication mode in operation 707. For example, the external electronic device 802 may group the first electronic device 811 and the second electronic device 812, which deactivate the Doppler mode into a first group 810, and may group the third electronic device 821 and the fourth electronic device 822, which activate the Doppler mode into a second group 820. Although FIG. 8 illustrates that the groups are classified according to whether the Doppler mode is activated/deactivated, the external electronic device 802 may group the plurality of electronic devices according to other criteria, e.g., according to a mid-amble insertion periodicity when there are a plurality of electronic devices activating the Doppler mode.

In operation 709, the external electronic device 802 transmits a data frame to at least one electronic device in response to the set communication mode. For example, when wireless communication is connected with one electronic device, the external electronic device 802 may transmit a data frame to the one electronic device in the requested communication mode. When wireless communication is connected with a plurality of electronic devices communicating in the same communication mode, the external electronic device 802 may transmit a data frame through scheduling between the plurality of electronic devices. When wireless communication is connected with a plurality of electronic devices communicating in different modes, as illustrated in FIG. 8, the external electronic device 802 may perform scheduling for each group and may transmit a data frame through scheduling between a plurality of electronic devices included in each group. For example, the external electronic device 802 may determine a communication time (first communication time) of the first group 810 and a communication time (second communication time) of the second group 820 through time division, and may be scheduled to transmit a data frame to the first electronic device 811 and the second electronic device 812, respectively, at the first communication time, and may be scheduled to transmit a data frame to the third electronic device 821 and the fourth electronic device 822, respectively, at the second communication time. The external electronic device 802 may transmit a first data frame and a second data frame to the first electronic device 811 and the second electronic device 812 in sequence or simultaneously at the first communication time, and may transmit a third data frame and a fourth data frame to the third electronic device 821 and the fourth electronic device 822 in sequence or simultaneously at the second communication time.

Figure 9:
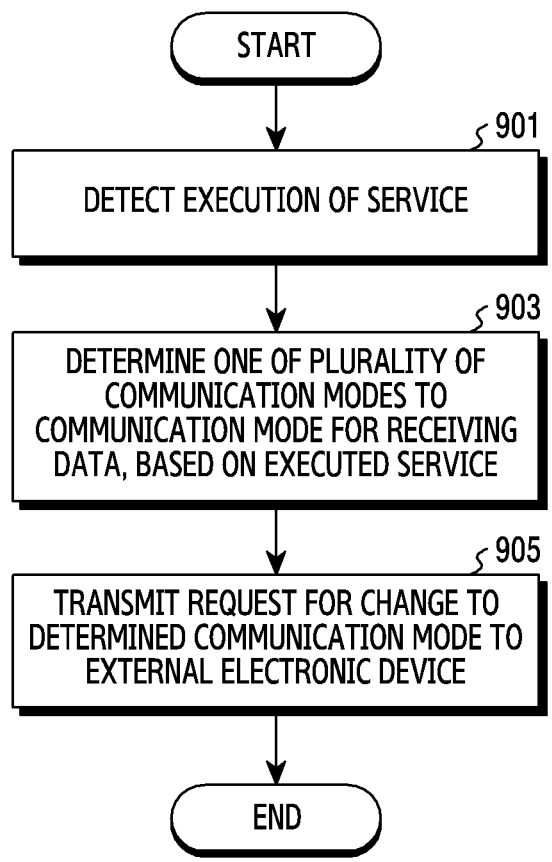
FIG. 9 is a flowchart illustrating a method for controlling a communication mode based on an ongoing service of an electronic device according to an embodiment.
Figure 10:
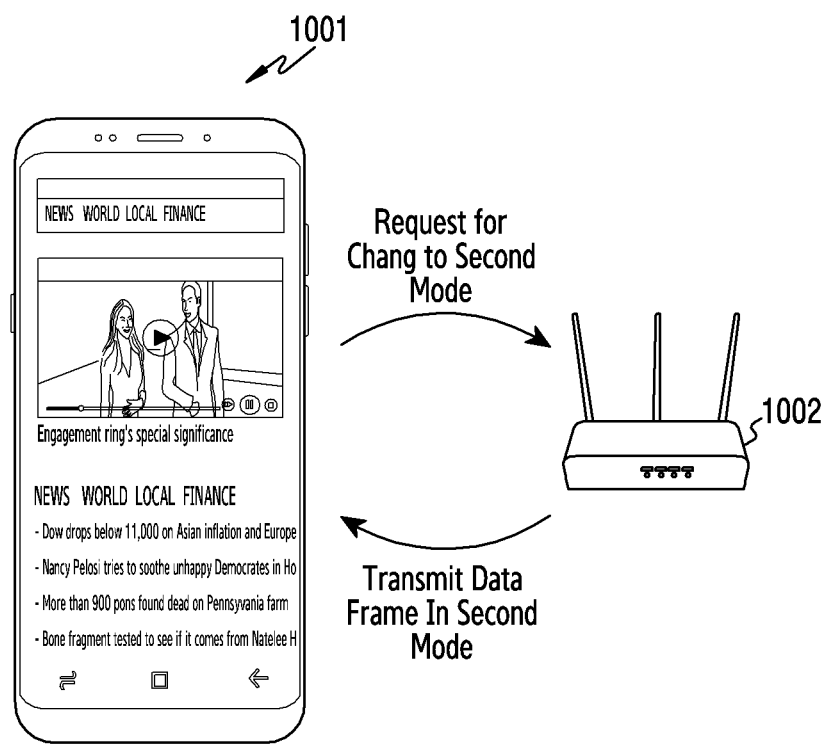
FIG. 10 illustrates a method for controlling a communication mode based on an ongoing service of an electronic device according to an embodiment.

FIG. 9 is a flowchart illustrating a method for controlling a communication mode based on an ongoing service of an electronic device according to an embodiment. FIG. 10 illustrates a method for controlling a communication mode based on an ongoing service of an electronic device according to an embodiment.

Referring to FIGS. 9 and 10, an electronic device 1001 (e.g., the electronic device 101 of FIG. 2) wirelessly communicates with an external electronic device 1002 (e.g., the external electronic device 202 of FIG. 2) by using a short-range wireless communication (e.g., Wi-Fi protocol).

In operation 901, a processor (e.g., the processor 120 of FIG. 1) of the electronic device 1001 detects execution of a service (or an application) in the electronic device 1001. The service may be a service that is sensitive to a quality of service (QoS), e.g., a service that should be provided seamlessly like video streaming or a voice over Internet protocol (VoIP).

In operation 903, the processor determines one of a plurality of communication modes (e.g., a first mode such as Doppler mode deactivation or a second mode, such as Doppler mode activation) to receive data from the external electronic device 1002, based on the ongoing service.

In operation 905, the processor transmits, to the external electronic device 1002, a request to change to the determined communication mode. For example, the processor of the electronic device 1001 may transmit a request to change to the second mode when an application (or App) for replaying a streaming video is executed or a streaming video is replayed. After receiving the request, the external electronic device 1002 may change to the second mode and transmit a data frame to the electronic device 1001 in the second mode.

The electronic device 1001 may determine use or non-use of the Doppler mode and a mid-amble insertion periodicity by combining information of the ongoing service and at least one of reception state information of the data frame (e.g., as illustrated in FIG. 5) and mobility information of the electronic device 1001 (e.g., as illustrated in FIG. 6), and may transmit the result of determining to the external electronic device 1002.

Figure 11:
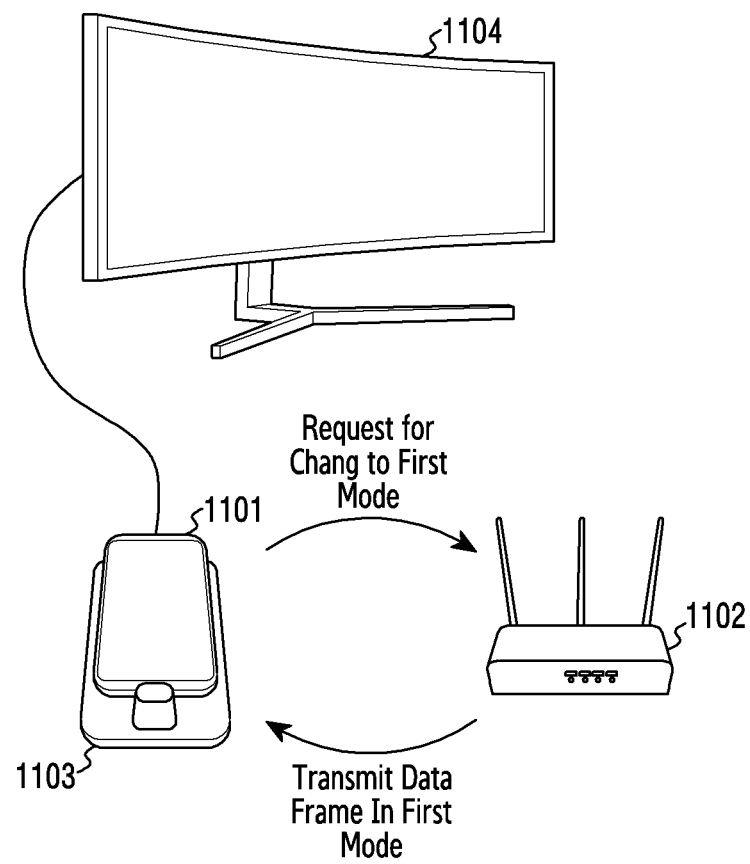
FIG. 11 illustrates a method for controlling a communication mode based on state information of an electronic device according to an embodiment.

FIG. 11 illustrates a method for controlling a communication mode based on state information of an electronic device according to an embodiment.

Referring to FIG. 11, an electronic device 1101 (e.g., the electronic device 101 of FIG. 2) may request a change of a communication mode based on state information. For example, the electronic device 1101 may be docked into an external device 1103 connected to an external display device 1104, while exchanging data with an external electronic device 1102 in a second mode in which the Doppler mode is activated. The external device 1103 may be a device that is not carried for use or is difficult to carry like a docking device or a wireless charger. Accordingly, when the electronic device 1101 is docked into the external device 1103, the electronic device 1101 may not be allowed to be moved or may have a limit to being moved. In this case, the electronic device 1101 may not need to use the Doppler mode since a channel change is not great. For example, when the Doppler mode is activated based on mobility information before the electronic device 1101 is docked into the external device 1103, the electronic device 1101 may need to deactivate the Doppler mode. When docking into the external device 1103 is detected, the electronic device 1101 may transmit, to the external electronic device 1102, a request to change to a first mode in order to deactivate the Doppler mode. After receiving the request, the external electronic device 1102 may change to the first mode, and transmit a data frame to the electronic device 1101 in the first mode.

As described above, whether the Doppler mode is used may be based on state information of the electronic device 1101 (e.g., whether or not movement is possible or likely). The electronic device 1101 may also determine use or non-use of the Doppler mode and a mid-amble insertion periodicity by combining state information of the electronic device 1101 and at least one of reception state information of a data frame (e.g., as illustrated in FIG. 5), mobility information (e.g., as illustrated in FIG. 6), and information of an ongoing service (e.g., as illustrated in FIG. 9), and may transmit the result of determining to the external electronic device 1102.

Figure 12:
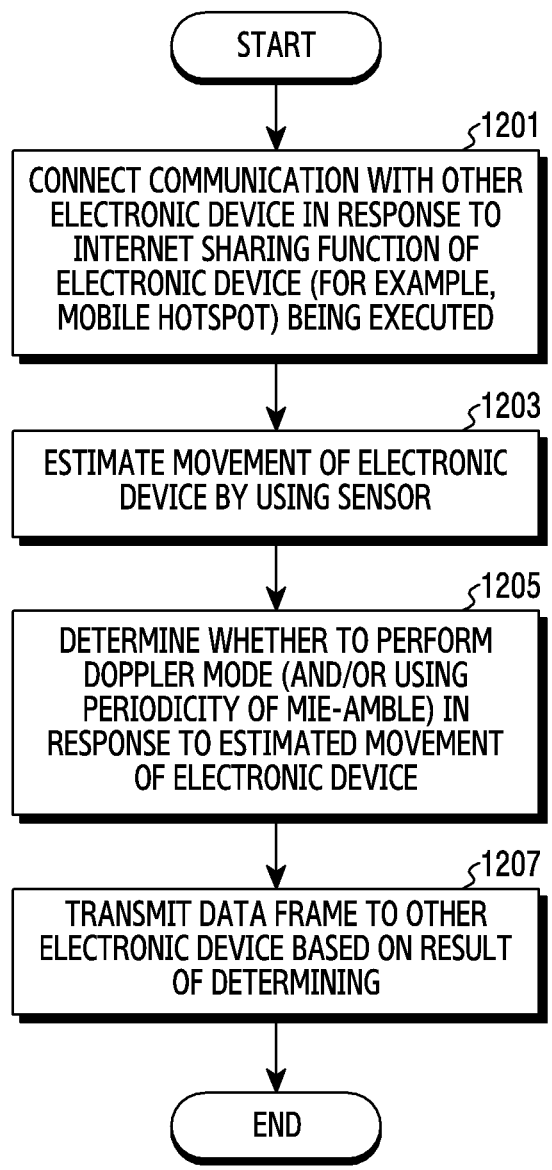
FIG. 12 is a flowchart illustrating a method for controlling a communication mode of an electronic device according to an embodiment.
Figure 13:
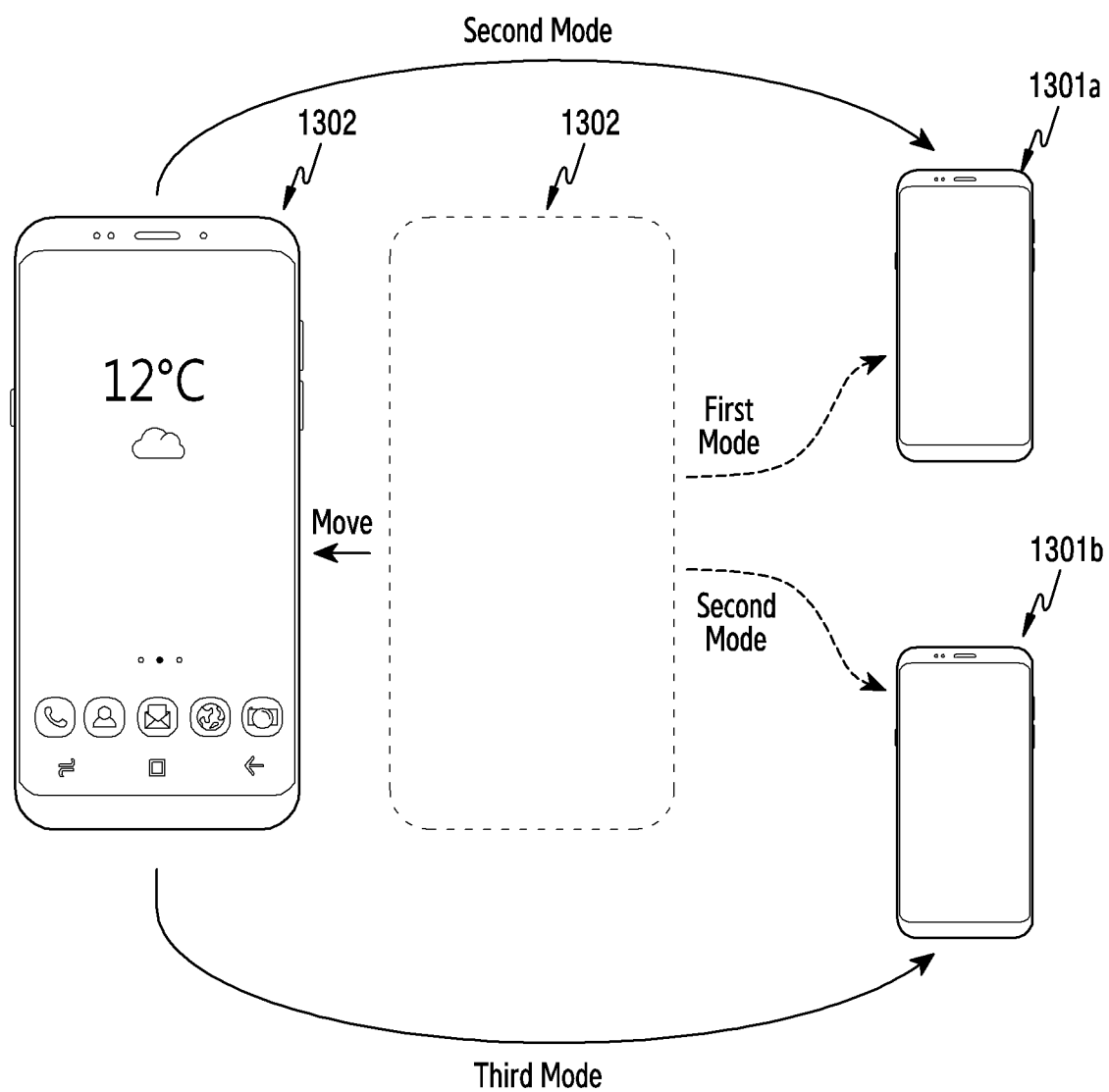
FIG. 13 illustrates a method for controlling a communication mode of an electronic device according to an embodiment.

FIG. 12 is a flowchart illustrating a method for controlling a communication mode of an electronic device according to an embodiment. FIG. 13 illustrates a method for controlling a communication mode of an electronic device according to an embodiment.

Referring to FIGS. 12 and 13, the electronic device 1302 (e.g., the electronic device 101 of FIG. 2) may be a smart phone that may provide an Internet sharing function (e.g., a mobile hotspot), or a mobile router (e.g., a long term evolution (LTE) router). When the Internet sharing function is executed, the electronic device 1302 may perform the role of the external electronic device (e.g., a wireless router) as described above with reference to explained in FIGS. 1-11.

In operation 1201, a processor (e.g., the processor 120 of FIG. 1) of the electronic device 1302 wirelessly connects with at least one other electronic device 1031*a* or 1301*b* in response to the Internet sharing function being executed. For example, the electronic device 1302 may communicate with the electronic device 1031*a* in a first mode (e.g., Doppler mode deactivation), or may communicate in a second mode (e.g., Doppler mode activation and a mid-amble insertion periodicity of 20 symbols) according to information transmitted from the electronic device 1301*b* (for example, information regarding use or non-use of the Doppler mode and/or a mid-amble insertion periodicity).

In operation 1203, the processor estimates a movement of the electronic device 1302 by using at least one sensor.

In operation 1205, the processor determines whether to perform the Doppler mode (or a mid-amble insertion periodicity) based on the estimated mobility information of the electronic device 1302. For example, when the estimated movement of the electronic device 1302 exceeds (or is greater than or equal to) a specified reference value, the processor may determine to change the communication mode with the electronic device 1031*a* from the first mode to the second mode (Doppler mode activation, the mid-amble insertion periodicity of 20 symbols) as illustrated in FIG. 13. Alternatively, the processor may determine to change the communication mode with the electronic device 1301*b* from the second mode to a third mode (Doppler mode activation, the mid-amble insertion periodicity of 10 symbols).

In operation 1207, the processor transmits a data frame to the electronic device 1031*a* and/or 1031*b*, respectively, based on the result of determining. For example, the electronic device 1301 may transmit the data frame to other electronic devices 1301*a* and 1301*b*, respectively, based on information related to the determined communication mode (the use or non-use of the Doppler mode and/or the mid-amble insertion periodicity).

As described above, the electronic device 1302 may determine the communication mode (the use or non-use of the Doppler mode and/or the mid-amble insertion periodicity) by considering its own mobility information.

The electronic device 1302 supporting the Internet sharing function may also determine a communication mode by considering both information transmitted from other electronic devices connected therewith (e.g., a request for execution of the Doppler mode and/or the mid-amble insertion periodicity), and its own mobility information. By doing so, the electronic device 1302 can accurately estimate a channel change and enhance QoS.

Figure 14:
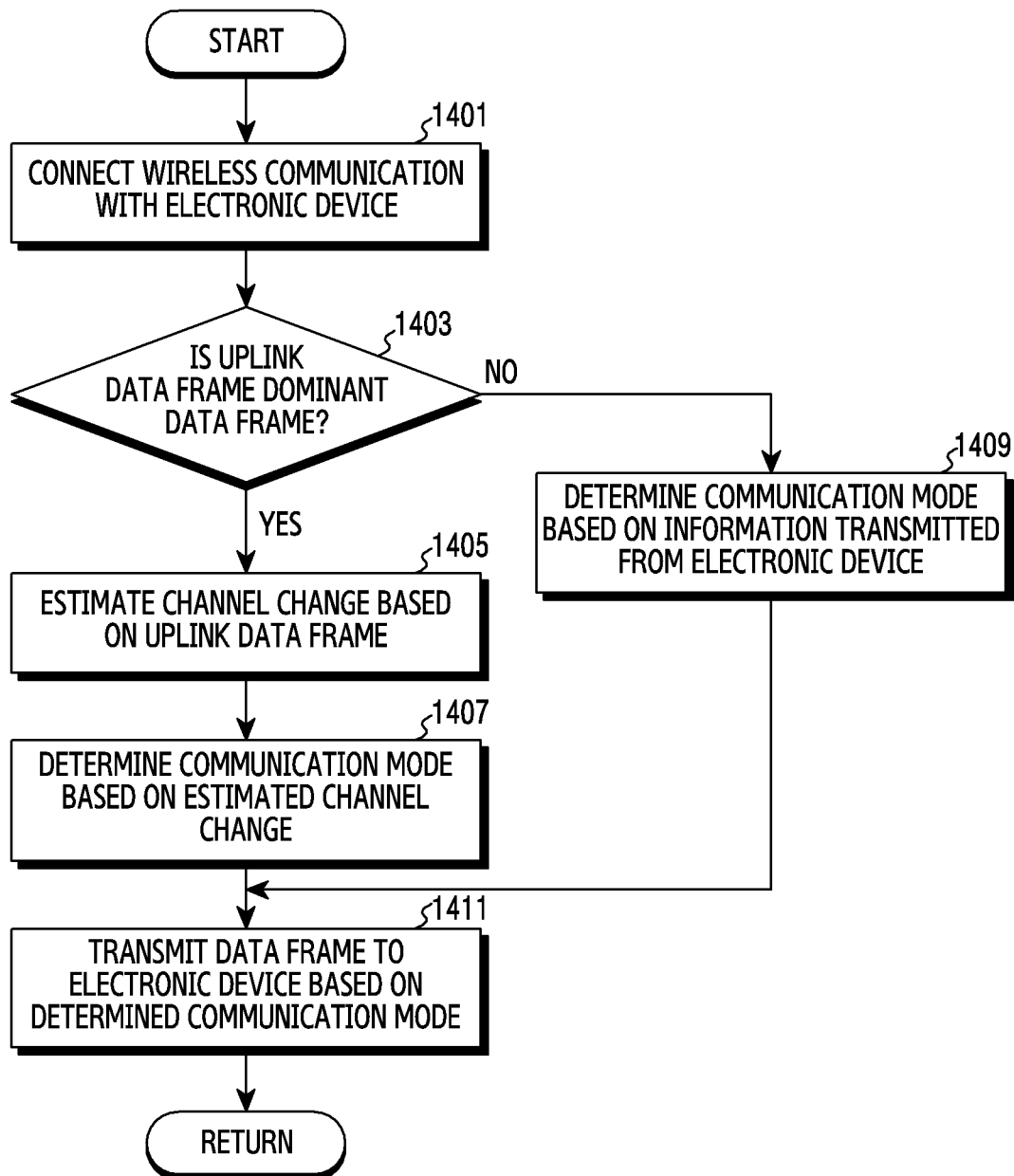
FIG. 14 is a flowchart illustrating a method for controlling a communication mode of an external electronic device according to an embodiment.

FIG. 14 is a flowchart illustrating a method for controlling a communication mode of an external electronic device according to an embodiment.

Referring to FIG. 14, in operation 1401, a processor of an external electronic device (e.g., the electronic device 102 of FIG. 1, the external electronic device 202 of FIGS. 2 and 3, the external electronic device 802 of FIG. 8, the external electronic device 1002 of FIG. 10, the external electronic device 1102 of FIG. 11, or the electronic device 1302 of FIG. 13) controls a wireless communication circuit (e.g., the wireless communication module 192 of FIG. 1) to wirelessly connect with at least one electronic device (e.g., the electronic device 101 of FIGS. 1, 2, and 3, the electronic device 1001 of FIG. 10, the electronic device 1101 of FIG. 11, or other electronic devices 1301*a*, 1301*b* of FIG. 13).

In operation 1403, the processor of the external electronic device identifies whether an uplink data frame is a dominant data frame. For example, when the number of data frames received from the electronic device for a predetermined time exceeds a reference value, the processor may determine that an uplink data frame is a dominant data frame. Alternatively, when a ratio of an uplink data frame and a downlink data frame for a specified time exceeds a reference value (e.g., 50%), the processor may determine that the uplink data frame is the dominant data frame.

When the uplink data frame is the dominant data frame in operation 1403, the processor estimates a channel change based on the uplink data frames in operation 1405.

In operation 1407, the processor determines a communication mode based on the estimated channel change. For example, when the channel change is less than a reference value, the processor of the external electronic device may determine to retain a communication mode, and when the channel change exceeds (or is greater than or equal to) the reference value, the processor may determine to change the communication mode (e.g., from a first mode to a second mode).

However, when the uplink data frame is not the dominant data frame in operation 1403, the processor determines a communication mode based on information transmitted from the electronic device (for example, information regarding whether the Doppler mode is executed and/or a mid-amble insertion periodicity) in operation 1409.

In operation 1411, the processor of the external electronic device controls a communication circuit to transmit a data frame to the electronic device based on the determined communication mode.

As described above, an entity for determining whether to execute the Doppler mode and/or a mid-amble insertion periodicity may be different based on a directionality of a data frame (e.g., uplink or downlink). For example, a side that receives more data frames may estimate channel information, thereby reflecting a channel change in real time.

Alternatively, the processor of the external electronic device may identify whether a downlink data frame is a dominant data frame in operation 1403, and when the downlink data frame is not the dominant data frame, the processor may estimate a channel change based on the uplink data frames in operation 1405. However, when the downlink data frame is the dominant data frame, the processor may proceed to operation 1409.

According to the above-described embodiments of the disclosure, when there is sufficient downward traffic, an electronic device may determine use or non-use of the Doppler mode, such that the Doppler mode can be used based on a change in a network environment. Further, whether the Doppler mode is used may be determined according to mobility information of the electronic device, which is obtained by using a sensor. Accordingly, even when downward traffic (data) for estimating a channel change is not sufficiently received, a channel change can still be estimated. As described above, a plurality of electronic devices may individually determine whether to use the Doppler mode by considering their respective network conditions, and therefore, QoS can be enhanced. For example, the electronic device may activate the Doppler mode when executing a service of video streaming or VoIP, such that data (frame) loss caused by a channel change can be minimized.

An electronic device according to various embodiments may include a portable communication device (e.g., a smartphone), a computer device, a portable multimedia device, a portable medical device, a camera, a wearable device, or a home appliance. However, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements.

A singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. Numerical terms such as "1st" and "2nd," or "first" and "second" may be used to simply distinguish a corresponding component from another, and do not limit the components in other aspect (e.g., importance or order).

If an element (e.g., a first element) is referred to, with or without the term "operatively" or "communicatively", as "coupled with," "coupled to," "connected with," or "connected to" another element (e.g., a second element), this indicates that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, a module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
a wireless communication circuit configured to wirelessly communicate with an external electronic device by using a short-range wireless communication protocol, the external electronic device being configured to transmit a first data frame including a first preamble, a first header, and a first payload in a first mode, and to transmit a second data frame including a second preamble, a second header, a second payload having at least one mid-amble in a second mode;
a processor operatively connected with the wireless communication circuit; and
a memory operatively connected with the processor,
wherein the memory stores instructions, which when executed, cause the processor to:
when a number of downlink data frames exceeds a reference value:
receive first data from the external electronic device at a first time through a wireless communication channel by using the wireless communication circuit,
receive second data from the external electronic device at a second time after the first time through the wireless communication channel by using the wireless communication circuit,
compare a first reception state related to the first data with a second reception state related to the second data, and
transmit, to the external electronic device, a first request to change from the first mode to the second mode by using the wireless communication circuit, based on a result of the comparing, and
when the number of downlink data frames is less than the reference value, receive information indicating whether to change communication mode of the wireless communication circuit from the external electronic device, and
wherein the first mode is a communication mode in which a Doppler mode is deactivated, and the second mode is a communication mode in which the Doppler mode is activated.

2. The electronic device of claim 1, wherein the instructions, when executed, further cause the processor to receive the first data frame comprising the first payload, from the external electronic device, in the first mode, and
wherein the first data and the second data are included in the first payload.

3. The electronic device of claim 1, wherein the instructions, when executed, further cause the processor to receive a first first data frame and a second first data frame from the external electronic device in the first mode,
  wherein the first data is included in the first first data frame, and
  wherein the second data is included in the second first data frame.

4. The electronic device of claim 1, wherein the short-range wireless communication protocol comprises an Institute of Electrical and Electronics Engineers (IEEE) 802.1 lax protocol.

5. The electronic device of claim 1, wherein the wireless communication channel comprises a specified frequency,
  wherein the first reception state is at the specified frequency when the first data is received,
  wherein the second reception state is at the specified frequency when the second data is received.

6. The electronic device of claim 5, wherein the specified frequency comprises a pilot sub-carrier frequency.

7. The electronic device of claim 5, wherein the instructions, when executed, further cause the processor to compare the first reception state related to the first data with the second reception state related to the second data based on a correlation between the first reception state and the second reception state.

8. The electronic device of claim 1, wherein the first data comprises a first orthogonal frequency division multiplexing (OFDM) symbol and the second data comprises a second OFDM symbol.

9. The electronic device of claim 1, wherein the first request is included in at least one of a header or a vendor specific information element.

10. The electronic device of claim 1, wherein the first request is included in a vendor specific action frame which is transmitted to the external electronic device.

11. The electronic device of claim 1, wherein the first request further comprises an insertion periodicity of the at least one mid-amble.

12. The electronic device of claim 1, wherein the instructions, when executed, further cause the processor to:
  receive third data from the external electronic device at a third time through the wireless communication channel by using the communication circuit,
  receive fourth data from the external electronic device at a fourth time after the third time through the wireless communication channel by using the communication circuit,
  compare a third reception state related to the third data with a fourth reception state related to the fourth data, and
  transmit a second request to change from the second mode to the first mode to the external electronic device based at least in part on a result of the comparing.

13. The electronic device of claim 1, further comprising a sensor, wherein the instructions, when executed, further cause the processor to:
  estimate a movement of the electronic device by using sensor information collected through the sensor, and
  transmit, to the external electronic device, a second request to change to the first mode or the second mode, based on the estimated movement of the electronic device.

14. The electronic device of claim 1, wherein the instructions, when executed, further cause the processor to:
  detect state information regarding whether the electronic device is movable, and
  transmit, to the external electronic device, a second request to change to the first mode or the second mode based on the state information.

15. The electronic device of claim 1, wherein the instructions, when executed, further cause the processor to:
  detect execution of a service that receives data from the external electronic device, and
  transmit, to the external electronic device, a second request to change to the first mode or the second mode based on information related to the executed service.

16. The electronic device of claim 1, wherein the external electronic device comprises an electronic device supporting mobile hotspot or a mobile router,
  wherein the external electronic device is further configured to:
    determine to maintain the second mode or to change to the first mode, based on mobility information of the external electronic device that is collected through a sensor, and
    transmit the first or second data frame to the electronic device according to a result of the determining.

17. The electronic device of claim 1, wherein the instructions, when executed, further cause the processor to:
  transmit, to the external electronic device, a result of comparing the first reception state and the second reception state, and
  receive the first or second data frame in the first or second mode, respectively, which is determined by the external electronic device based on a result of the comparing.

18. The electronic device of claim 1, wherein the external electronic device is configured to:
  in a first communication environment with the electronic device in which an uplink data frame is dominant, estimate a channel change based on the uplink data frame, and determine to change to the first mode or the second mode based on the estimated channel change; and
  in a second communication environment with the electronic device in which a downlink data frame is dominant, determine to change to the first mode or the second mode based on the request to change received from the electronic device.

* * * * *